(12) United States Patent
Hattersley

(10) Patent No.: US 9,521,225 B2
(45) Date of Patent: Dec. 13, 2016

(54) FRAME AND APP FOR SMARTPHONE FOR AUDIO READING CODED TEXT

(71) Applicant: John R. Hattersley, Skaneateles, NY (US)

(72) Inventor: John R. Hattersley, Skaneateles, NY (US)

( * ) Notice: Subject to any disclaimer, the term of this patent is extended or adjusted under 35 U.S.C. 154(b) by 119 days.

(21) Appl. No.: 14/631,944

(22) Filed: Feb. 26, 2015

(65) Prior Publication Data

US 2015/0242668 A1    Aug. 27, 2015

Related U.S. Application Data

(60) Provisional application No. 61/945,334, filed on Feb. 27, 2014.

(51) Int. Cl.
*H04M 1/725*    (2006.01)
*H04M 1/04*    (2006.01)

(52) U.S. Cl.
CPC ........... *H04M 1/04* (2013.01); *H04M 1/72594* (2013.01); *H04M 1/72522* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 8,559,063 B1 * | 10/2013 | Booppanon | G03B 15/07 358/302 |
| 9,137,430 B1 * | 9/2015 | Aono | H04N 5/23293 |
| 9,280,036 B2 * | 3/2016 | Kasahara | G03B 15/03 |
| 9,325,909 B2 * | 4/2016 | Kasahara | H04N 5/2354 |
| 9,350,894 B2 * | 5/2016 | Kasahara | H04N 1/19594 |
| 2016/0178112 A1 * | 6/2016 | Shi | F16M 11/046 348/150 |

* cited by examiner

*Primary Examiner* — Kristy A Haupt
(74) *Attorney, Agent, or Firm* — Bernhard P. Molldrem, Jr.

(57) ABSTRACT

A small fold-down optical frame holds a smart phone that is provided with reading software that enables those with vision impairment to be able to hear the written word as audible speech. The frame has a tray and a base and legs connecting them. The tray holds the smart phone and positions it so that its camera is placed directly over a coded symbol containing the content of the printed page. One corner of the base is shaped such that a vision-impaired person can place the frame, by feel or touch, at the proper location for the smart phone to pick up the coded symbol.

5 Claims, 3 Drawing Sheets

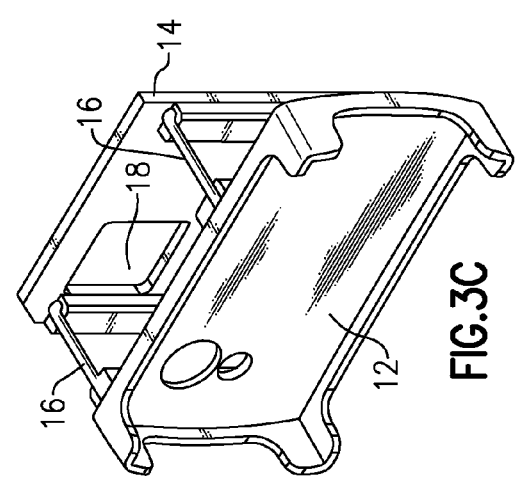
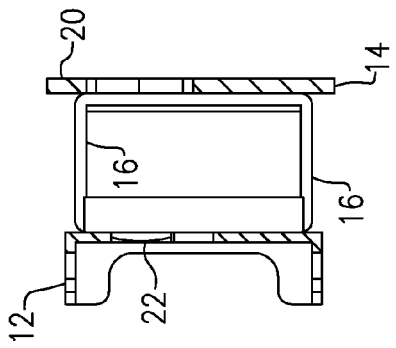
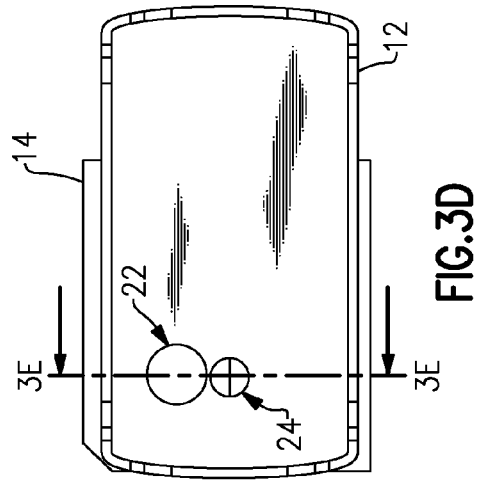
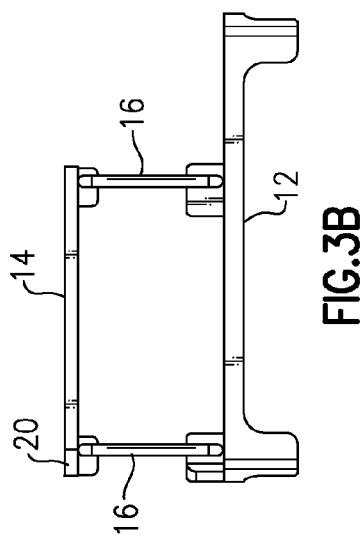
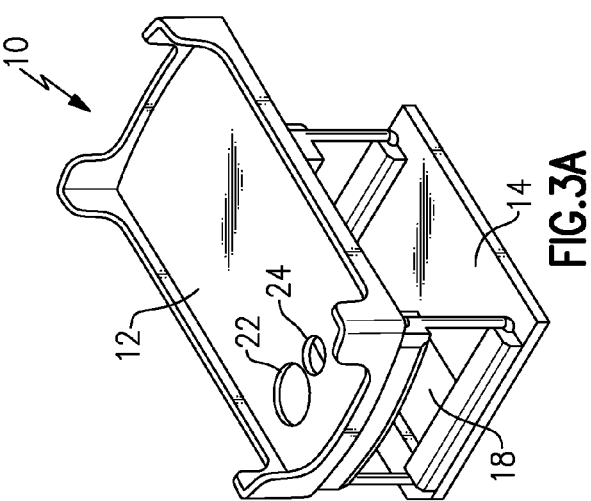

FRAME AND APP FOR SMARTPHONE FOR AUDIO READING CODED TEXT

Priority is claimed of U.S. Provisional Application Ser. No. 61/945,334, Feb. 27, 2014, the disclosure thereof being incorporated by reference herein.

BACKGROUND OF THE INVENTION

The invention is directed to the combination of a small optical frame with a unique PDT (Print Disabled Text) reading software for a smartphone that enables those with vision impairment to be able to hear the written word spoken to them through their smartphone.

The small collapsible frame enables the reading of a uniquely developed coding of complete pages of information in only a three-quarter inch (18 mm) square spot (containing a 2-D bar code) located in an upper corner of a printed page. The easy-to-feel cut (chamferred) corner of the base allows those with vision impairment to easily align the frame with the clipped corner of a properly encoded sheet of paper or with the inner seam (spine) of a magazine or book.

This combination is especially helpful for those with vision impairment, dyslexia, and/or other reading limitations.

The system works with many or most popular smartphone models, i.e., those with a built-in camera, speaker and processing capability. The user snaps the smartphone into the frame, which then automatically aligns the built-in camera with the frame's magnifying lens, and holds the phone at an optimal position for reading the high-density PDT code printed on the page.

The intelligent software package, i.e., app, is loaded into the smartphone, and the encoded information in the PDT code is recovered and deciphered, allowing the words to be spoken by either the built-in smartphone speaker, Bluetooth enabled hearing aids or ear pieces, or earphones plugged into the smartphone. The user can thus easily hear the written text that has been read by the camera in their smartphone and spoken by the smartphone.

The system is designed to be easy to use. Tapping the icon for the app software starts the application on the smartphone, and the user merely slides the base of the unit over to the corner of the page where the PDT code is located. Instantly the unit begins to "read" aloud to the user the corresponding text it has deciphered from the PDT code. The PDT can be configured for multiple languages, and the system can speak in the user's native language (or other language that the user selects) of what is deciphered. The text in multiple languages may all be present in the PDT coded symbol, or the translation may be carried out by the software in the smartphone, or the translation and speech conversion may be carried out on-line. The translation may be carried out automatically.

The PDT code is a custom type of 2-D bar coding, somewhat similar to conventional 2-D bar codes, but utilizes special physical and encoding compression that allows the embedding of thousands of characters of information into one small image. The placement of the PDT coded symbol is preferably specified to be at a consistent location on the printed page, so that even a totally blind person can find it and use the system to convert the printed words to audible speech.

BRIEF DESCRIPTION OF THE DRAWING

FIGS. 3A to 3I are views that show the construction of the frame, wherein

FIG. 3A is a front perspective;
FIG. 3B is an inverted side elevation;
FIG. 3C is another perspective;
FIG. 3D is a top plan;
FIG. 3E is a section taken at 3E-3E or FIG. 3D;
FIG. 3F is an end elevation;
FIG. 3G is a side elevation;
FIG. 3H is an end elevation opposite to that of FIG. 3F; and
FIG. 3I is a bottom plan.

DETAILED DESCRIPTION

Figure 1:
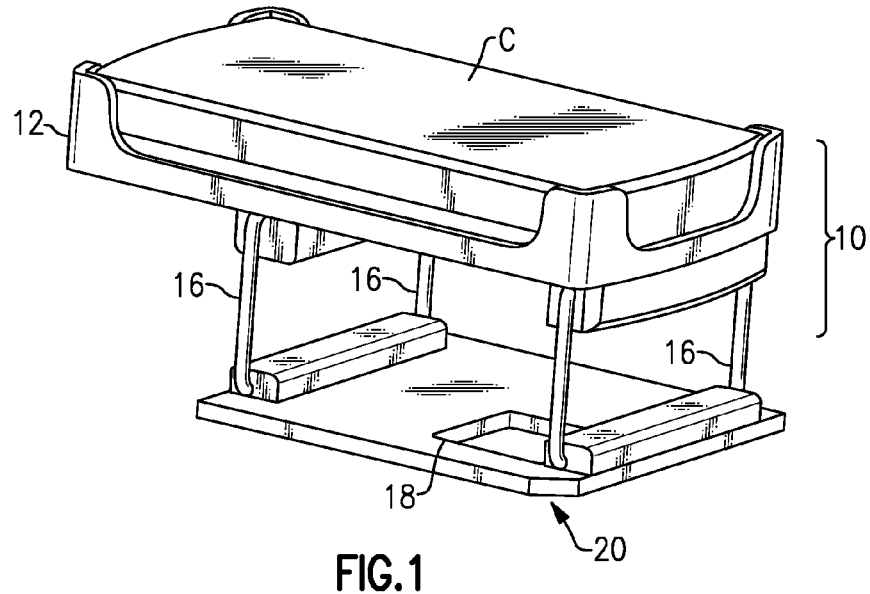
FIG. 1 is a perspective view showing the frame or holder with a smartphone, and with the base swung down to an open position.
Figure 2:
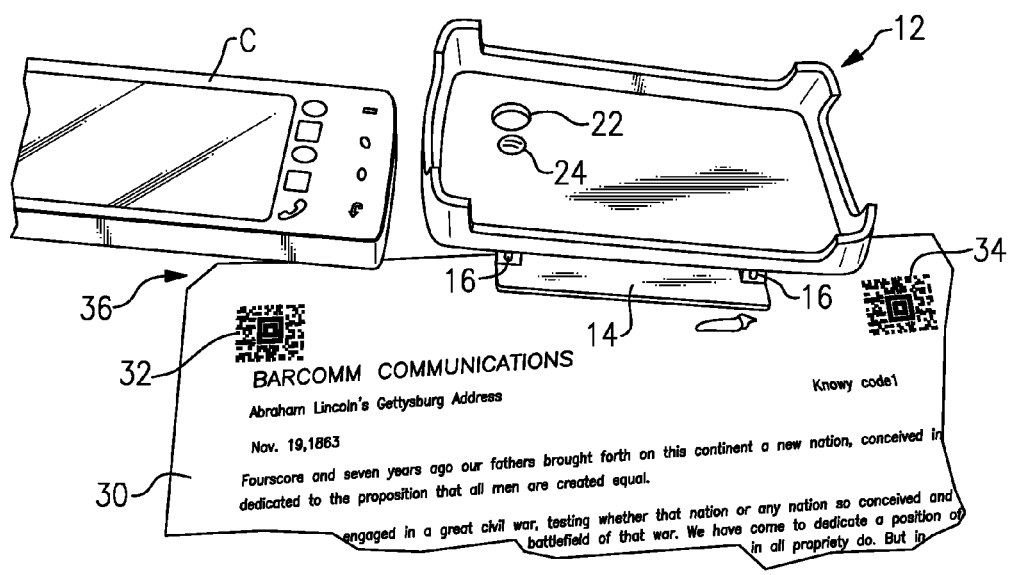
FIG. 2 is another perspective view showing a smartphone, the frame separate from the phone, and a page of printed text with one or more bar-coded symbols readable according to this invention.
Figure 3H:
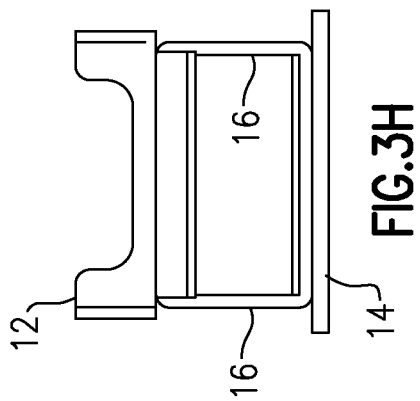
Figure 3G:
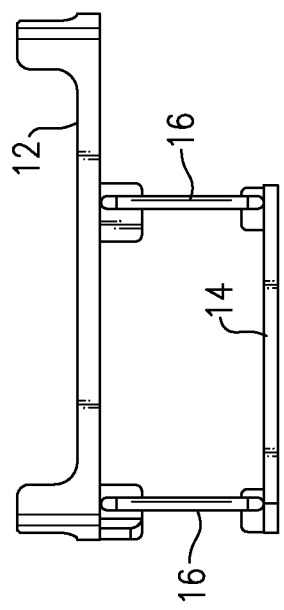
Figure 3I:
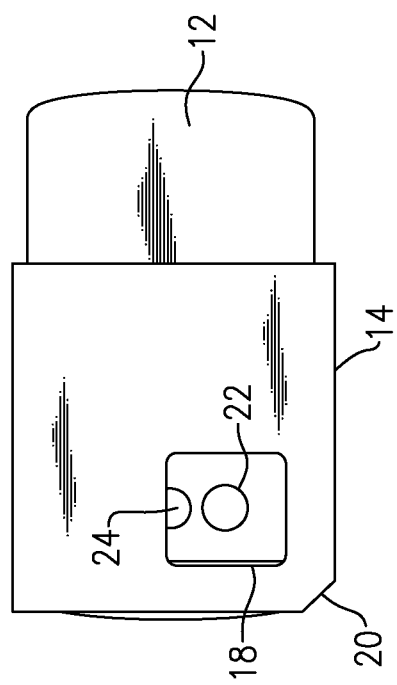
Figure 3F:
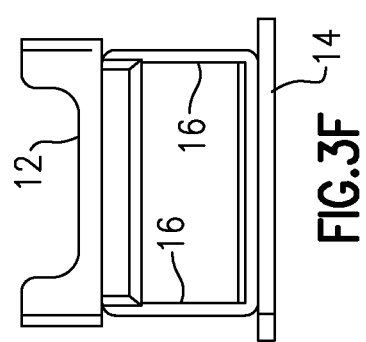

As shown in FIGS. 1 and 2, a portable smartphone C, e.g., an iPhone, an Android phone, or other widely used smart cell phone with built in camera, speaker and/or earphone plug or Bluetooth audio, and basic digital processing and wireless capabilities, and capable of being loaded with an app (software application) is here shown in combination with the frame 10. In FIG. 1, the phone C is held in a tray 12 of the frame, and in FIG. 2, the phone C is shown removed exposing the inside of the tray 12. The tray 12 has a flat base, with sides and an open top so the phone C fits snugly in it but can be removed. Beneath this is a generally rectangular base 14, and there are swing-up, swing-down legs 16 connecting the tray 12 and base 14. The frame 10 folds flat for normal phone use or for fitting into a pocket or purse, but the legs 16 allow the base 14 to be pulled out and down for use in reading PDT codes. These parts are also shown in FIGS. 3A to 3I.

The base 14 has a square aperture or opening intended to align with a PDT code that may be printed on the page or sheet, and which aligns with the camera lens of the phone C when the base 14 is down, in the position shown in FIG. 1.

The base has one chamferred corner 20 to permit a sight-impaired user to align, by touch, the base 14 with the corner of the printed page. The relevant corner of the page may also be likewise chamferred or cut.

As seen in FIG. 2, the tray has an aperture or camera window 22, with focusing lens, to align with the camera of the phone C and focus at the distance to the square opening 18, i.e., to focus on the PDT code. Alongside this aperture 22 is a diffuse opening or window 24 for illuminating the PDT code from an LED or other light source on the phone C.

As also shown in FIG. 2, a printed page 30 has a coded symbol 32 at one corner and another coded symbol 34 at another corner. These two symbols may contain the same or different information. Also, one corner 36 of the page is cut diagonally, so as to match the chamfer 20 of the base 14, to facilitate alignment of the frame 10 with the symbol 32.

In some cases, the coded symbols may be "invisible" in normal use, but visible under so-called black light, and thus may be printed superposed on the normal text. The location for the tray can be determined by feel, and thus the "invisible" codes function well for vision-impaired.

While the invention has been described with respect to some preferred embodiments, it should be understood that the invention is not limited to those specific embodiments. Rather, many modifications and variation would present themselves to persons skilled in this art without departing from the scope and spirit of this invention, as defined in the appended claims.

I claim:

1. A system for optically reading coded symbols printed at a predetermined position on a printed page, comprising:
   a smartphone including a case, a camera, a processing capability, and a capability of producing audible output;
   a frame for holding the smartphone, which includes a tray into which the smartphone fits, the tray having a camera window corresponding to the position of the camera of the smartphone; a flat base for resting on the printed page, the base having an aperture therein to place on a coded symbol on the printed page; and retractable legs for allowing the base to collapse against the tray and allowing the base to extend so that the base spaces the tray a predetermined distance above the printed page, the base having a geometrically shaped means for assisting the user to locate the base on said printed page by touch to align the tray and said camera with the coded symbol; and
   a software application program loaded onto the smartphone configured to permit the smartphone to decode the symbol and convert information decoded from the symbol to audible speech.

2. The system according to claim 1, wherein said geometrically shaped means on said base includes a chamferred corner of said base.

3. The system according to claim 1, wherein said tray includes a diffuse window alongside said camera window.

4. The system according to claim 3, wherein said camera window includes a focusing lens to align with the camera of the phone and focus at the distance to the aperture on the base of the tray and thus to focus on the coded symbol.

5. The system according to claim 1, wherein said aperture on said base is substantially coextensive with the coded symbol.

* * * * *